United States Patent  (10) Patent No.: US 7,219,958 B2
Yamazaki et al.  (45) Date of Patent: May 22, 2007

(54) CHILD SEAT

(75) Inventors: Kojiro Yamazaki, Saitama (JP);
Hidenori Yanaka, Saitama (JP);
Mitsuru Washizuka, Saitama (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 10/487,246

(22) PCT Filed: Aug. 22, 2002

(86) PCT No.: PCT/JP02/08449

§ 371 (c)(1),
(2), (4) Date: Feb. 20, 2004

(87) PCT Pub. No.: WO03/018352

PCT Pub. Date: Mar. 6, 2003

(65) Prior Publication Data

US 2004/0232747 A1  Nov. 25, 2004

(30) Foreign Application Priority Data

Aug. 22, 2001  (JP)  .............................. 2001-251306

(51) Int. Cl.
*A47D 1/10* (2006.01)
*B60N 2/28* (2006.01)
*B60N 2/42* (2006.01)

(52) U.S. Cl. .............................. 297/256.13; 297/250.1; 297/216.11

(58) Field of Classification Search ........... 297/216.11, 297/216.12, 216.13, 216.15, 216.16, 216.19, 297/250.1, 256.13, 463.1
See application file for complete search history.

(56) References Cited

U.S. PATENT DOCUMENTS 3,767,259 A * 10/1973 Blake et al. ........... 297/256.13
4,215,900 A *  8/1980 Coult ...................... 297/254
4,681,368 A     7/1987 Heath et al.
4,858,997 A *  8/1989 Shubin .................... 297/487
5,158,337 A * 10/1992 Leggett ................ 297/250.1
5,468,045 A * 11/1995 Weber ................ 297/216.11

(Continued)

FOREIGN PATENT DOCUMENTS

EP  1090805 A1  4/2001

(Continued)

*Primary Examiner*—Rodney B. White
*Assistant Examiner*—Stephen Vu
(74) *Attorney, Agent, or Firm*—Birch, Stewart, Kolasch & Birch, LLP

(57) ABSTRACT

This child car seat includes a child car seat body, a back portion rotatably held in inclination by the child car seat body, a seat portion rotatably connected to a lower part of the back portion and a shock absorbing mechanism arranged between the child car seat body and either one or both of the back portion and the seat portion. The seat portion and the back portion hold a newborn. When an impact force directing from a front face side of the back portion toward its back face side is applied on the newborn, the back portion rotates in its rising direction and the shock absorbing mechanism operates to reduce the impact force applied on the newborn. Consequently, the newborn can be held on the child car seat in a state close to a condition where the newborn lies on its back. Since the back portion stands up at the time of impact, the newborn is capable of receiving the impact through the whole area of a newborn's back.

27 Claims, 14 Drawing Sheets

U.S. PATENT DOCUMENTS

| | | | |
|---|---|---|---|
| 5,915,787 A * | 6/1999 | Brookman | 297/256.13 |
| 6,062,642 A * | 5/2000 | Sinnhuber et al. | 297/216.13 |
| 6,109,689 A * | 8/2000 | Nanni | 297/216.1 |
| 6,220,662 B1 * | 4/2001 | Franco-Vila et al. | 297/256.13 |
| 6,447,060 B1 * | 9/2002 | Vila et al. | 297/256.13 |
| 6,513,870 B1 * | 2/2003 | Takizawa | 297/216.11 |
| 6,568,755 B1 * | 5/2003 | Groening | 297/256.13 |
| 6,641,211 B2 * | 11/2003 | Takizawa | 297/216.11 |
| 6,739,661 B1 * | 5/2004 | Dukes | 297/256.13 |
| 6,871,908 B2 * | 3/2005 | Takizawa | 297/216.11 |
| 6,921,133 B2 * | 7/2005 | Taoka et al. | 297/216.11 X |

FOREIGN PATENT DOCUMENTS

| | | |
|---|---|---|
| JP | 32934/1988 | 3/1988 |
| JP | 2-127134 A | 5/1990 |
| JP | 10-6830 A | 1/1998 |
| JP | 2001-97086 A | 4/2001 |

* cited by examiner

CHILD SEAT

TECHNICAL FIELD

The present invention relates to a child car seat for reducing an impact force applied on a baby.

BACKGROUND OF THE INVENTION

In order to reduce the impact force applied to a passenger at a vehicle collision, generally, it is preferable to make a back face of a seat nearly perpendicular thereby receiving an impact by a back of the passenger.

However, when a youth, particularly, a newborn (child) is placed on a child car seat, an angle between a seat face and a back face of the seat is increased as much as possible so that the newborn can lie on its back in the seat because the neck of the newborn is not firm yet. Particularly, when the child weighing less than 10 kg is placed, the child car seat is held backward to a vehicle traveling direction and further, the newborn's body is fixed on the child car seat with a belt.

When an impact acts on the front part of a vehicle with the seat fixed in the above way, the newborn's shoulder is subjected to a concentrated load through a shoulder belt. In particular, there is a problem that the more the seat is reclined, in other words, the newborn is laid down, the more a load exerted to the newborn's shoulder is increased.

In order to solve the above-mentioned problem, it is an object of the present invention to provide a child car seat which allows an impact acting on the newborn's body at a vehicle collision to be reduced while the child car seat is normally holding a newborn in a manner that it nearly lies on its back.

SUMMARY OF THE INVENTION

The first feature of the present invention resides in the provision of a child car seat comprising a child car seat body, a back portion rotatably held in inclination by the child car seat body, a seat portion rotatably connected to a lower part of the back portion and a shock absorbing member arranged between the child car seat body and either one or both of the back portion and the seat portion, wherein the seat portion and the back portion are adapted so as to hold a newborn thereon, and the child car seat is constructed in a manner that when an impact force directing from a front face side of the back portion toward a back face side of the back portion is applied on the newborn, the back portion rotates in its rising direction and the shock absorbing member operates to reduce the impact force applied on the newborn. Accordingly, despite of holding the newborn in a condition where it nearly lies on its back at a normal state, it is possible to prevent an impact from concentrating in a part of the newborn at the time of impact.

According to the second feature of the invention, a rotation pivot of the back portion is positioned above a gravity center of the newborn. Thus, by making use of an inertia force, it is possible to certainly carry out the rising of the back portion with a simple structure and without requiring a special device.

According to the third feature of the invention, the back portion is rotatably born by the child car seat body. Therefore, by making use of an inertia force at the maximum it is possible to rotate the back portion, thereby accomplishing the rising of the back portion.

According to the fourth feature of the invention, a front end part of the seat is movable along an extending direction of the seat portion at its normal state.

According to the fifth feature of the invention, the seat portion is adapted so as to swing in parallel with the seat portion at its normal state.

According to the sixth feature of the invention, the back portion is rotatably born by a bearing member and the bearing member is movably held by the child car seat body. Accordingly, by distributing a part of inertia force to the movement of the bearing member, it is possible to reduce an abrupt rising of the back portion, allowing an impact on the newborn to be decreased furthermore.

According to the seventh feature of the invention, the bearing member is movable up and down and the seat portion moves in a plane containing the seat portion at its normal state.

According to the eighth feature of the invention, the bearing member is movable up and down, and the seat portion moves in parallel with the seat portion at its normal state.

According to the ninth feature of the invention, the shock absorbing member is adapted so as to absorb an impact because of a plastic deformation of the shock absorbing member. Therefore, it is possible to perform a shock absorbing operation exhibiting a high attenuation and an awkward vibration.

According to the tenth feature of the invention, the shock absorbing member is adapted so as to absorb the impact since one member digs into another member.

According to the eleventh feature of the invention, the child car seat further comprises a position maintaining device which is arranged between the child car seat body and either one or both of the back portion and the seat portion to maintain a position of either one or both of the back portion and the seat portion in relation to the child car seat body, at a normal state of the child car seat.

According to the twelfth feature of the invention, the position maintaining device is composed of an elastic member.

According to the thirteenth feature of the invention, the position maintaining device is composed of a joint part which is broken when a predetermined tension is applied thereon.

According to the fourteenth feature of the invention, the back portion is provided with a rotating means which forcibly rotates the back portion in a direction to raise the back portion when an impact force is applied thereon. Therefore, it is possible to carry out the rising of the back portion certainly.

According to the fifteenth feature of the invention, the rotating means comprises a switch mechanism which operates when the impact force is applied, and a force mechanism which is driven by the switch mechanism.

According to the sixteenth feature of the invention, the switch mechanism is arranged in a back portion of the child car seat body and which is adapted so as to operate when a seat belt for holding the child car seat body presses the switch mechanism with a force more than a predetermined force, due to an impact.

According to the fifteenth feature of the invention, the force mechanism includes a shaft, a spring engaged with the shaft to project the shaft against the back portion of the child car seat body and an engagement mechanism which engages the shaft while compressing the spring, and the force mechanism is adapted so as to be driven since the engagement mechanism is disengaged by the switch mechanism, whereby the shaft is projected to press the back portion.

BRIEF DESCRIPTION OF THE DRAWINGS

FIGS. 8A and 8B are views showing a force mechanism of FIGS. 5 and 6, in which FIG. 8A is a front view of the force mechanism and FIG. 8B is a side view of the force mechanism;

FIGS. 9A and 9B are views showing a condition that a disengaging cam has rotated a rotary disc in the force mechanism of FIGS. 8A and 8B, in which FIG. 9A is a front view of the above condition and FIG. 9B is a side view of the same condition;

DESCRIPTION OF THE PREFERRED EMBODIMENT

With reference to FIGS. 1 to 18B, one embodiment of the present invention will be described below.

Figure 1:
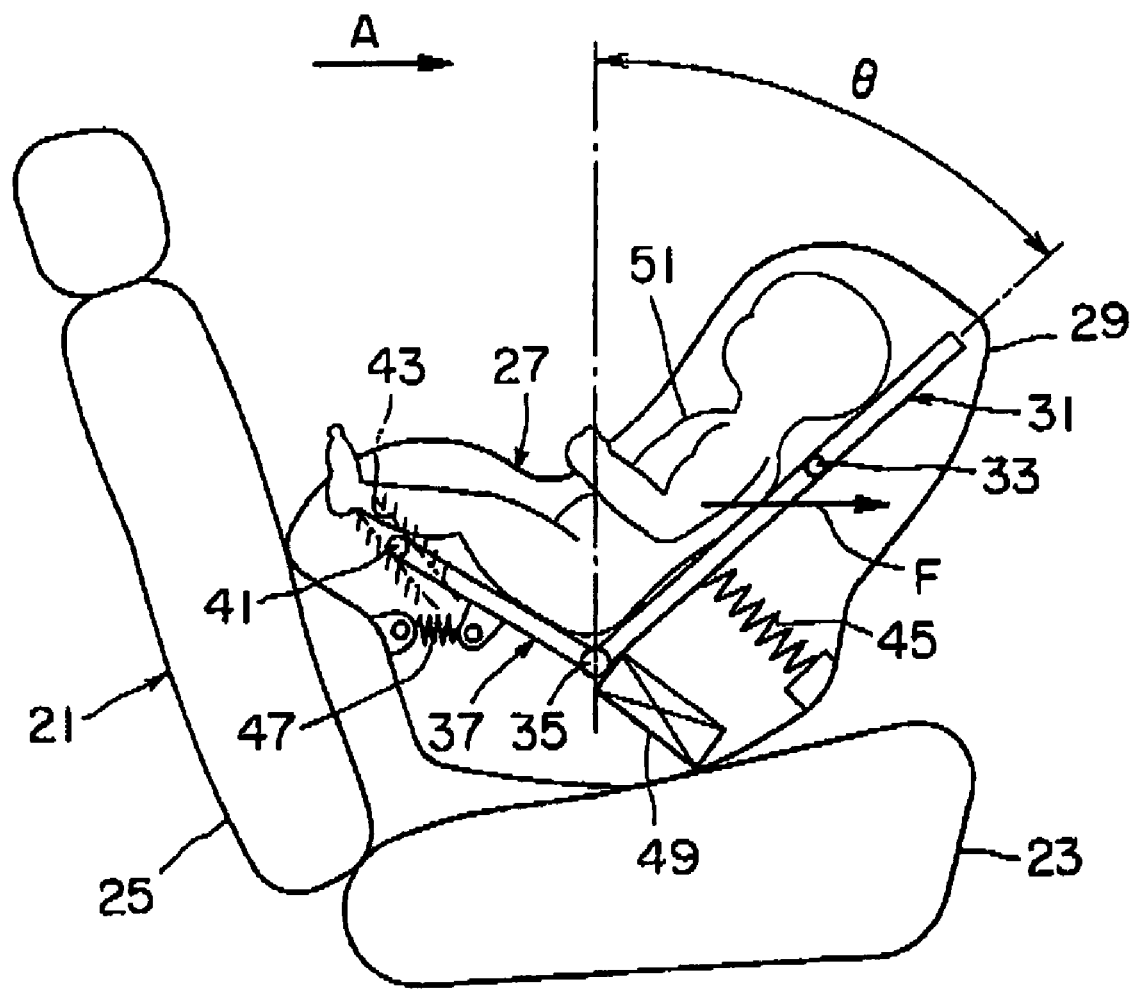
FIG. 1 is a schematic side view showing a child car seat in accordance with a first embodiment of the present invention.

In FIG. 1, reference numeral 21 designates a vehicle seat provided in an automobile or the like: A child car seat 27 is fixed on a seat portion 23 and a back portion 25 of the vehicle seat 21 with a seat belt etc., facing backward to a traveling direction A.

The child car seat 27 has a child car seat body 29 in the form of a bucket. The child car seat body 29 is provided with a back portion 31. This back portion 31 is rotatable about a rotating shaft 33 fixed to the child car seat body 29 to form a rotating center.

At the lowermost end of the back portion 31, there is arranged a seat portion 37 which is rotatable to the back portion 31 through a connecting part 35. The seat portion 37 has its front end part 41 guided by a later-mentioned guide 43 in a substantial fore-and-aft directions Accordingly, when the back portion 31 rotates back and forth about the rotating shaft 33 as the rotating center, the seat portion 37 connected with the back portion 31 at the connecting part 35 moves in the substantial fore-and-aft direction while the front end part 41 is being guided.

The back portion 31 and the seat portion 37 are supported by urging springs 45, 47 provided in the child car seat body 29, respectively. In the normal state, the back portion 31 is inclined at an angle θ with the perpendicular line, so that the seat portion 31 is supported in inclination so that the front end part 41 gets higher than the connecting part 35. Further, the back portion 31 and the seat portion 37 are arranged to form a substantial L-shaped pattern in side view.

Note that two urging springs 45, 47 are not always required for supporting the back portion 31 and the seat portion 37 and therefore, either of them will do. Further, the seat portion 37 is not always required to be inclined so as to heighten the front end part 41 and therefore, the seat portion 37 may be supported horizontally.

Further connected with the connecting part 35 is a shock absorbing mechanism 49 of which another end is supported by the child car seat body 29. The shock absorbing mechanism 49 is adapted so as to operate when the child car seat body 29 is subjected to a strong impact, such as collision.

Figure 2:
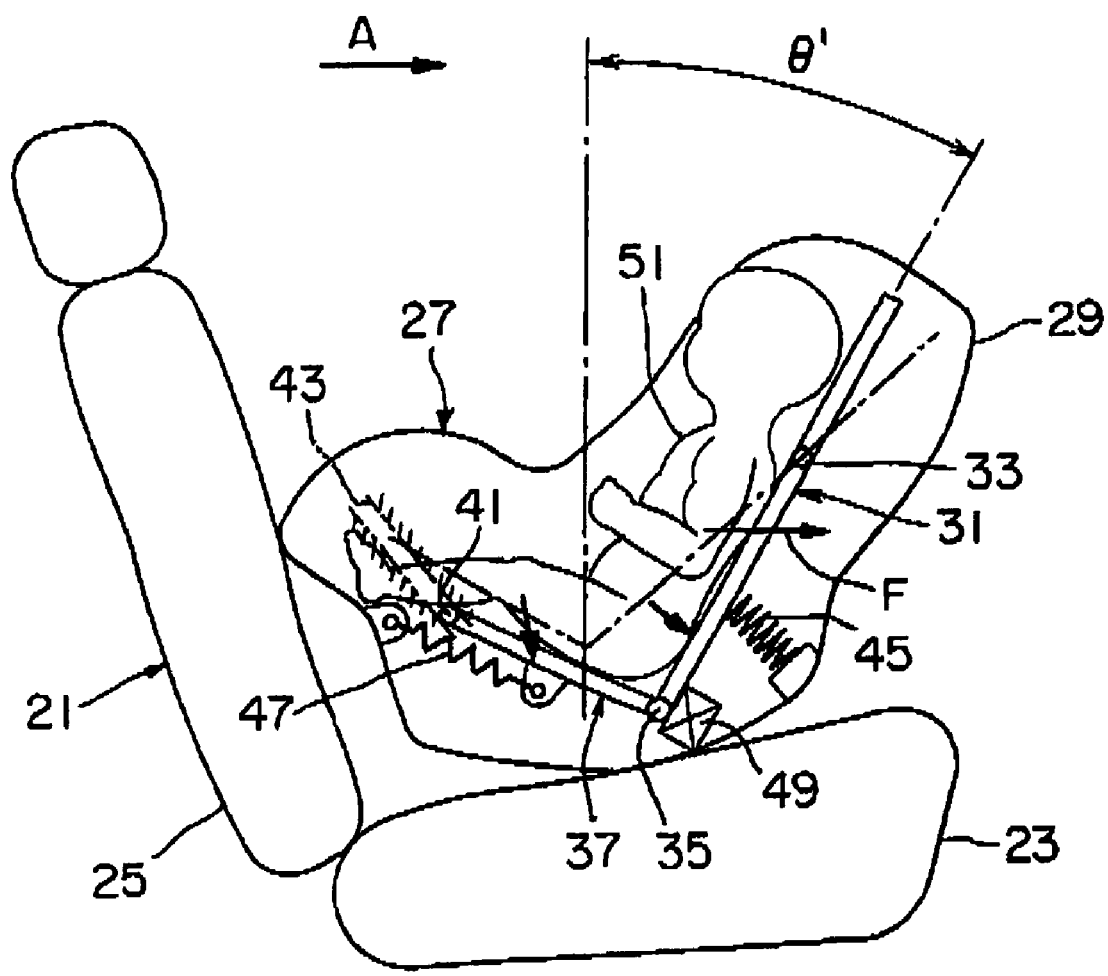
FIG. 2 is a schematic side view show a condition of exerting an impact on the child car seat of FIG. 1.

A newborn 51 is seated on the so-constructed child car seat 27 and fixed thereto through a belt or the like, while directing backward to the traveling direction A In the above constitution, as shown in FIG. 2, when an inertia force F is applied on the newborn 51 at a vehicle's sudden braking, the back portion 31 rotates in the counterclockwise direction in opposition to a pressing force of the urging spring 45 and a tensile force of the urging spring 47 since a working point of the inertia force F is below the rotating shaft 33, so that the back portion 31 stands up. Further, the seat portion 37 is also drawn by the back portion 31 through the connecting part 35 and moves to the right in FIG. 2. Then, the front end part 41 of the seat portion 37 is guided by the guide 43. In this way, as the back portion 31 rises due to the inertia force F, it is received by the whole back of the newborn, whereby it is possible to prevent a load from concentrating in a part of the newborn's body, such as shoulder. Additionally, without a special device, it is possible to raise the back portion 31 owing to the inertia force. Therefore, it is possible to realize a reliable action of the child car seat in spite of its simple mechanism and also possible to reduce the manufacturing cost of the child car seat.

Figure 4:
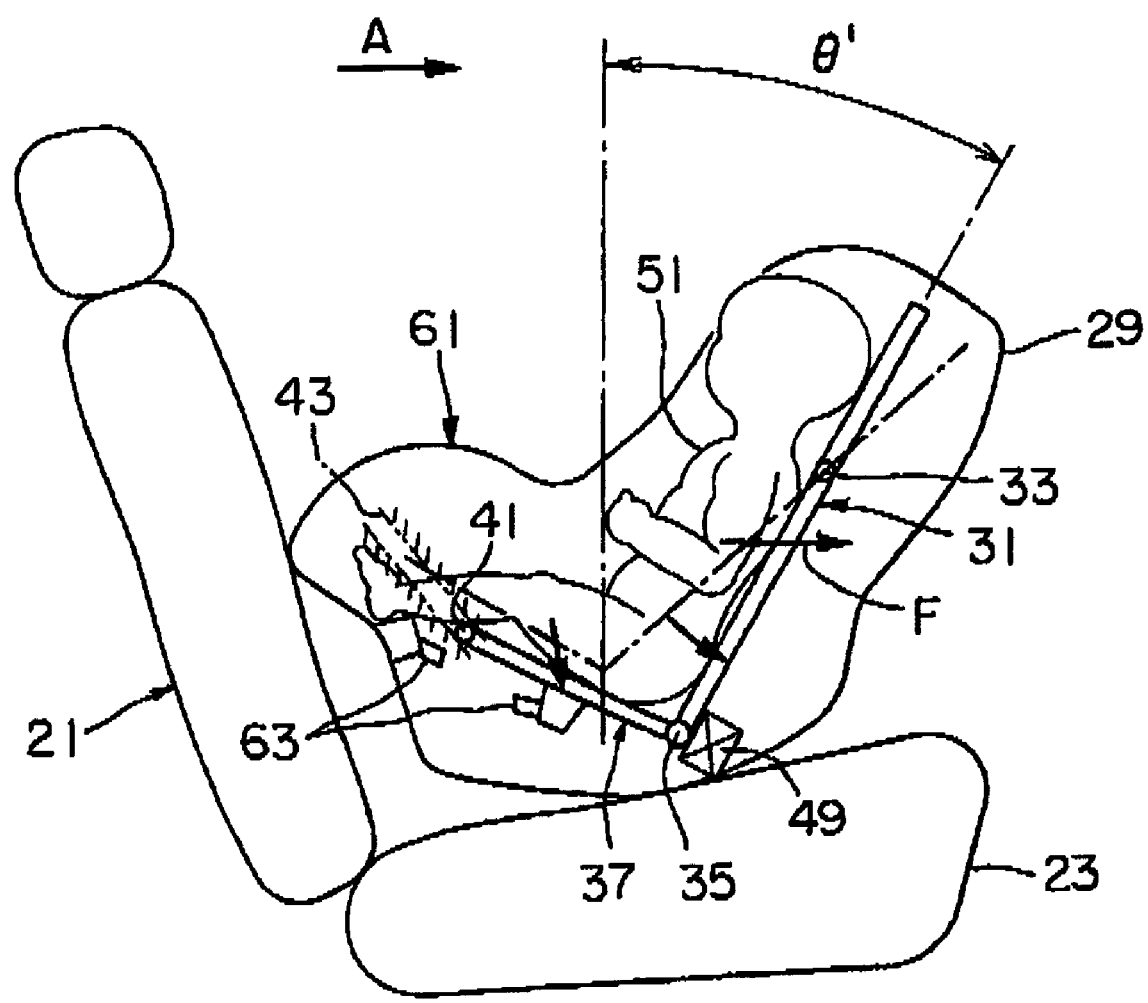
FIG. 4 is a schematic side view showing a condition of exerting an impact on the child car seat of FIG. 3.

Additionally, when a great inertia force F is applied on the newborn at a vehicle collision, the shock absorbing mechanism 49 operates to allow an impact force on the newborn to be reduced and attenuated. In this case, the back portion 31 rises near perpendicularly furthermore, so that an angle to the perpendicular line decreases from θ to θ' as shown in FIG. 4. Therefore, the newborn receives the inertia force through the newborn's back whereby it is possible to prevent a load from concentrating in part of the newborn's body, such as the shoulder.

In the above-mentioned embodiment, the arrangement where the shock absorbing mechanism 49 is connected to the connecting part 35 has been described. Alternatively, it is not always required that the shock absorbing mechanism 49 is connected to the connecting part 35 and therefore, the mechanism 49 may be connected to either the back portion 31 or the seat portion 37.

Figure 3:
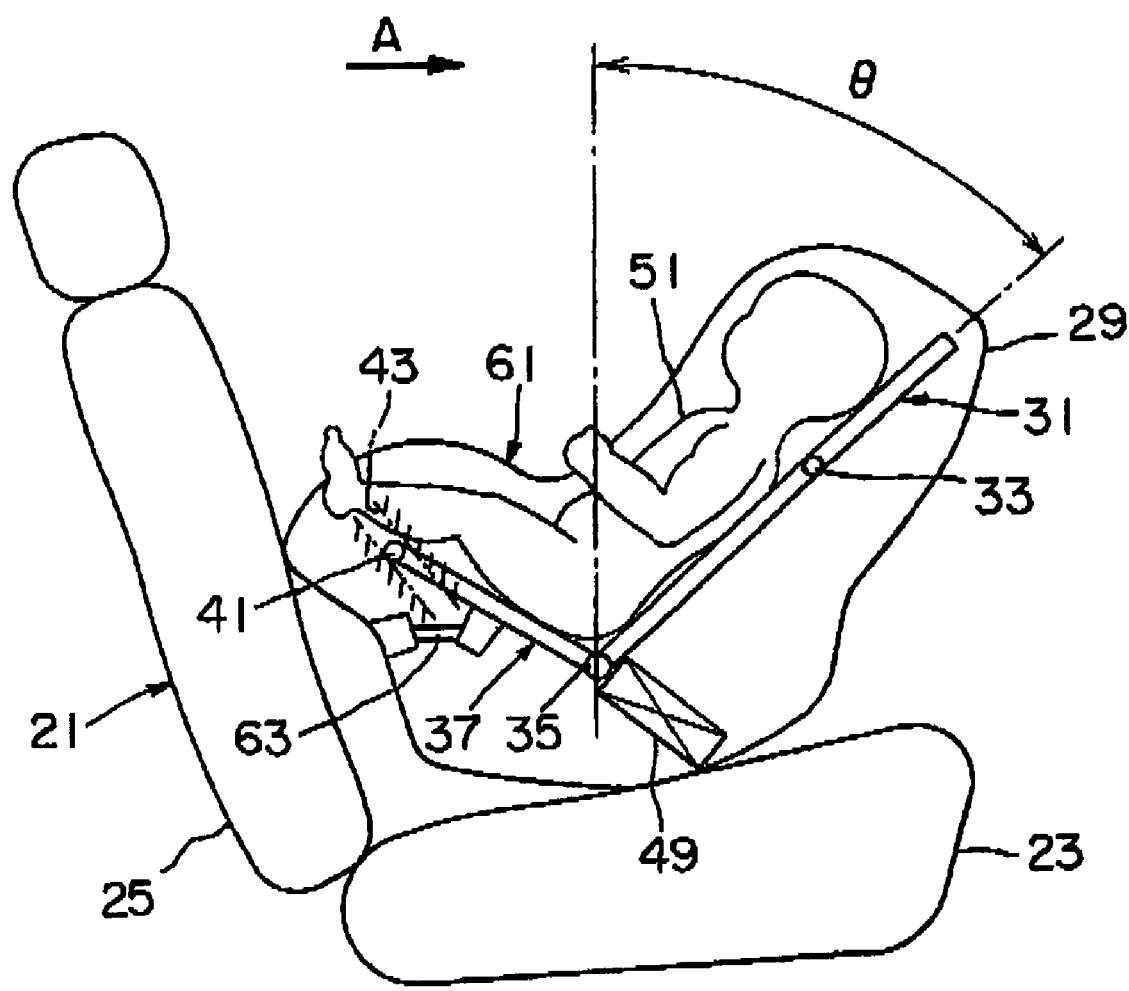
FIG. 3 is a schematic side view showing a child car seat in accordance with a second embodiment of the present invention.

FIG. 3 is a view showing a child car seat 61 in accordance with the second embodiment of the present invention. This child car seat 61 differs from the child car seat 27 of FIG. 1 in that the seat portion 37 is supported by a joint part 63 in the child car seat 61 of FIG. 3, while the back portion 31 and the seat portion 37 are normally supported by the urging springs 45, 47 in the child car seat 27. The other constitutions of are similar to those of the child car seat 27, respectively. Therefore, elements identical to those of the child car seat 27 are indicated by the same reference numerals respectively and their overlapping descriptions are eliminated.

In the constitution as above, when a great inertia force F is applied on the newborn 51 at a vehicle's sudden braking, the back portion 31 is subjected to a rotating force in the counter-clockwise direction about the rotating shaft 33 as a rotating center. Due to this rotating force, a force to the right direction of FIG. 4 is applied to the seat portion 37. If the inertia force F derived from the above collision is larger than a predetermined value, then the joint part 63 is broken, so that the back portion 31 rotates in the counter-clockwise direction and the seat portion 37 moves to the right. Owing to this force and these movements, the shock absorbing mechanism 49 operates to allow an impact force on the newborn to be reduced. Noted that, at this time, the front end part 41 of the seat portion 37 moves along the guide 43.

Since the joint part 63 is broken and the back portion 31 rotates, the back portion 31 rises, so that an angle of the back portion 31 to the perpendicular line decreases from θ to θ'. Therefore, the newborn receives the inertia force through the newborn's back as shown in FIG. 4, whereby it is possible to prevent a load from concentrating in a part of the newborn's body, such as the shoulder.

Figure 5:
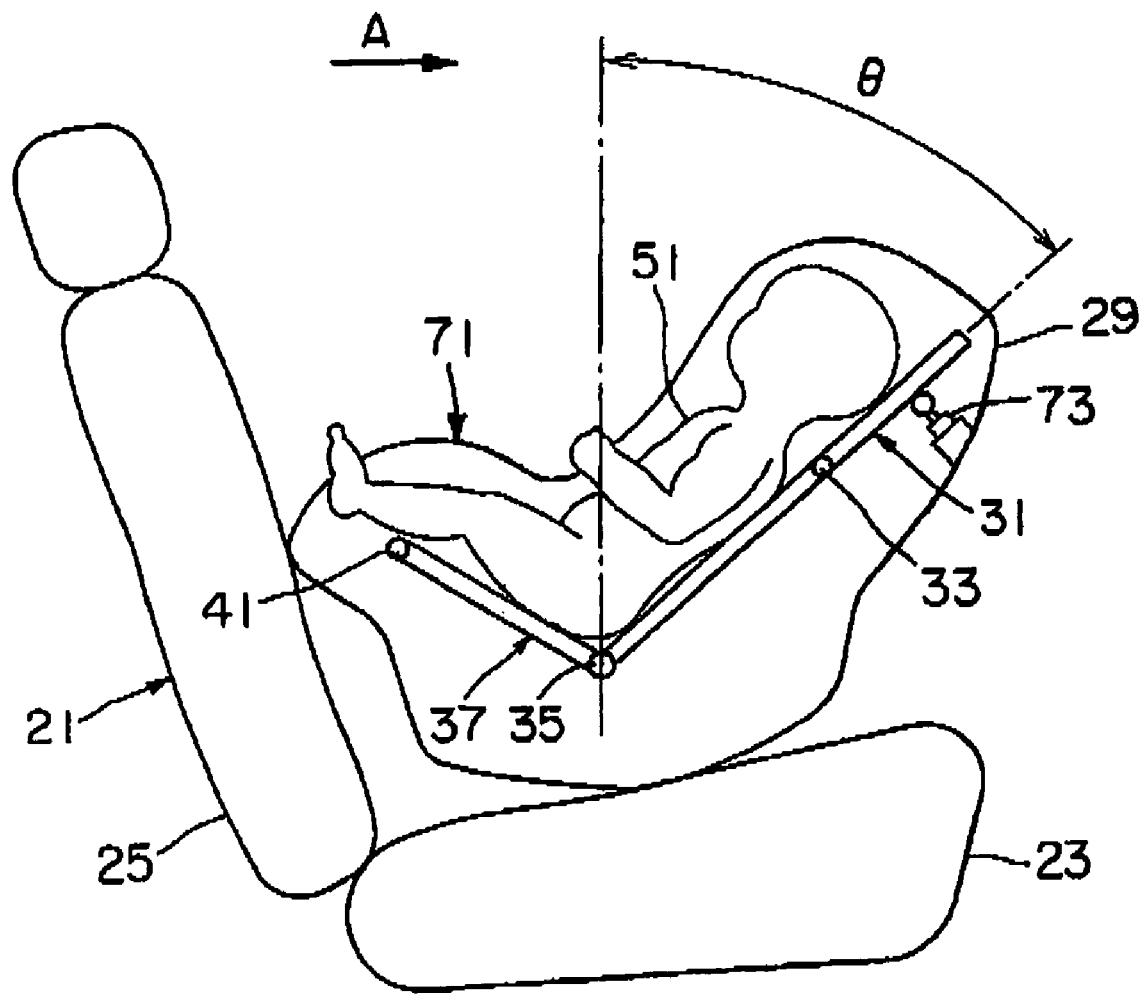
FIG. 5 is a schematic side view showing a child car seat in accordance with a third embodiment of the present invention.

FIG. 5 is a view showing a child car seat 71 in accordance with the third embodiment of the present invention. This child car seat 71 differs from the child car seats 27, 61 of FIGS. 1 and 3 in that a force mechanism 73 is arranged in a position above the rotating shaft 33 of the back portion 31b. In this child car seat 71, though not shown in FIG. 5, the urging spring 45 and the urging spring 47 of FIG. 1 or the joint part 63 support the back portion 31 and the seat portion 37, respectively and the child car seat 71 is also equipped with the shock absorbing mechanism 49. The operations at the time of receiving an impact are also similar to those of the afore-mentioned child car seats.

Figure 7A:
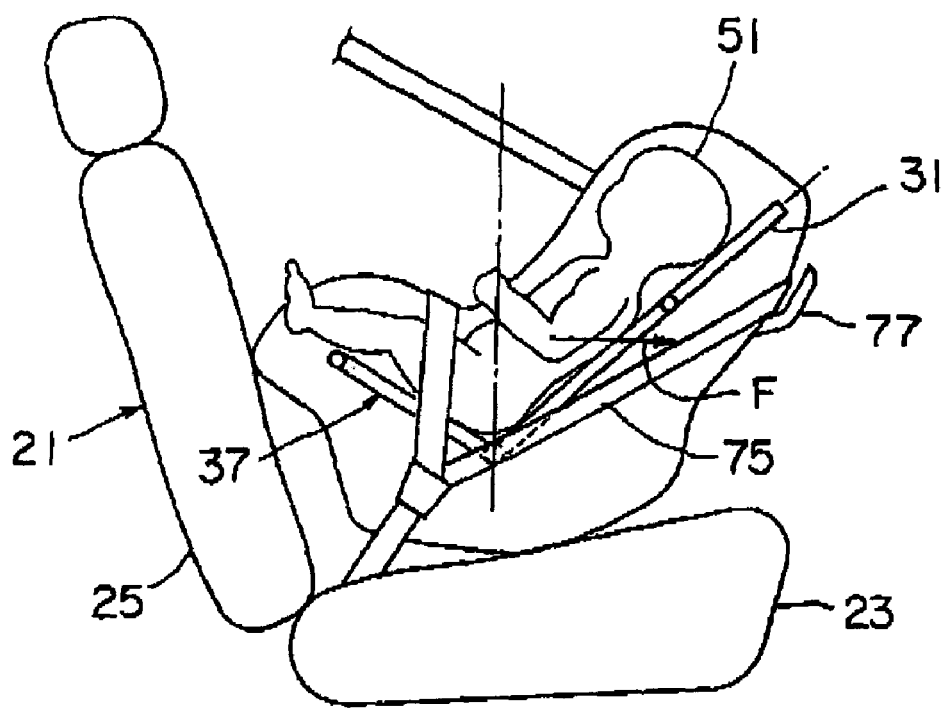
FIG. 7A is a schematic side view showing a method of fixing the child car seat on an automotive seat of FIG. 5.

This child car seat 71 with the force mechanism is fixed to the seat 21 of the vehicle by means of a seat belt 75, as shown in FIG. 7A. Then, the seat belt 75 is engaged with a belt guide 77 on a back portion of the child car seat body 29. Inside the belt guide 77, there is provided a switch 81 that drives the above force mechanism 73.

Figure 7B:
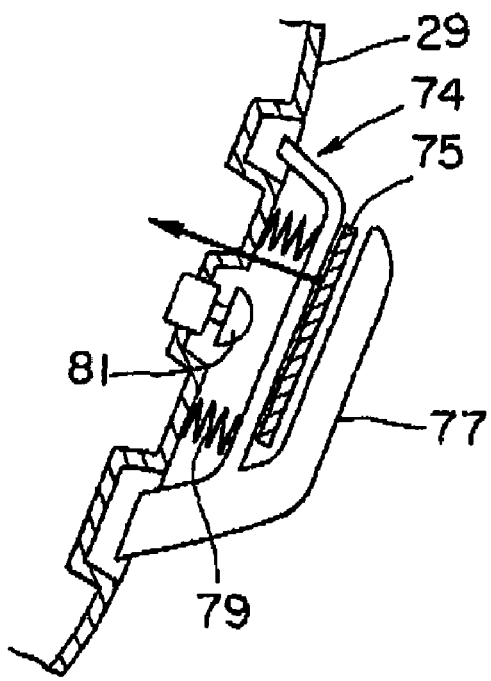
FIG. 7B is a sectional view of a force mechanism for the child car seat of FIG. 7A.
Figure 8A:
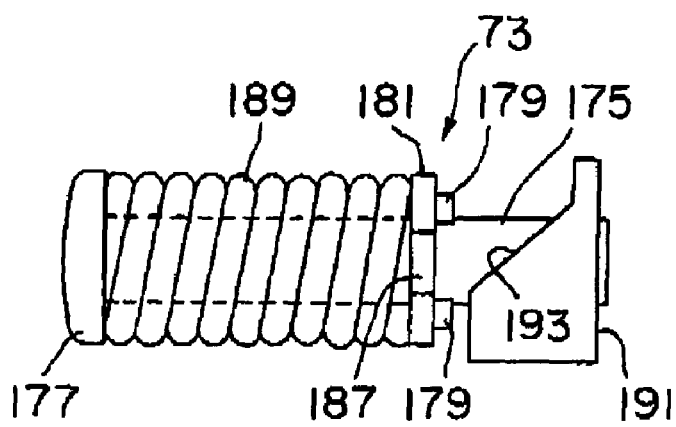
Figure 8B:
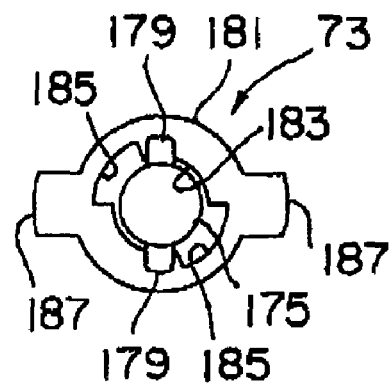
Figure 9A:
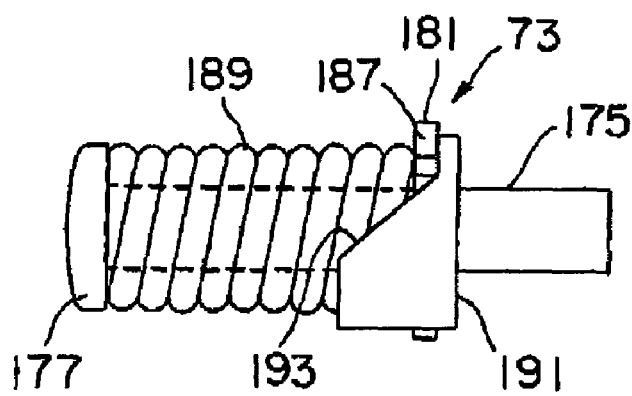
Figure 9B:
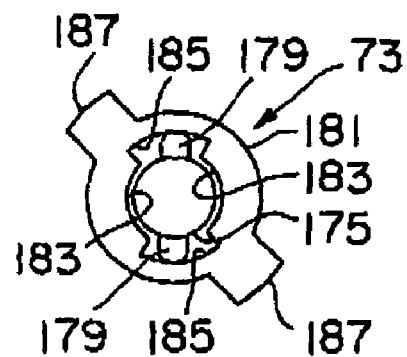
Figure 10:
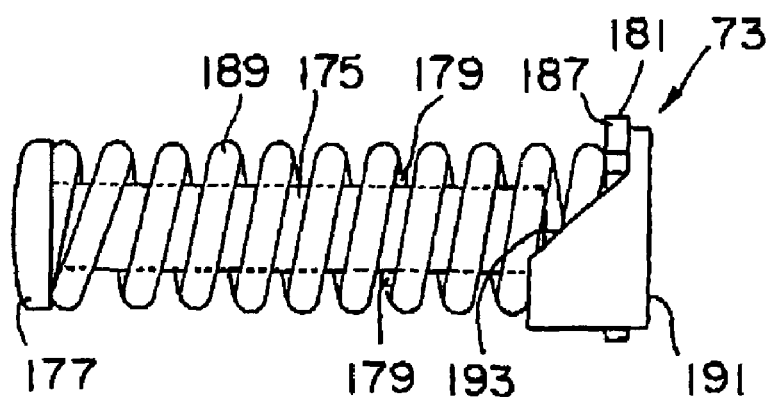
FIG. 10 is a front view showing a condition after the force mechanism of FIGS. 8A and 8B has been operated.

FIG. 7B is a view showing a switch mechanism 74 for activating the force mechanism 73. The belt guide 77 is supported by the child car seat body 29 trough springs 79. Further, the switch 81 is positioned between the belt guide 77 and the child car seat body 29. When the belt guide 77 is strongly presses against the child car seat body 29 by the seat belt 75, the belt guide 77 presses the switch 81 in opposition to respective forces of the springs 79, so that the force mechanism 73 is activated.

FIG. 8A to FIG. 10 are views each showing the force mechanism 73. This force mechanism 73 has a shaft 175 provided, on its one end, with a flange part 177. This flange part 177 is fixed on the back portion 31 in order to push up the back portion 31. On a shaft's peripheral face near the other end of the shaft 175 and at respective positions apart from each other by an angle of 180 degrees in the circumferential direction, engagement projections 179 are formed so as to project outward in the radial direction of the shaft. On one side of the engagement projections 179 closer to the flange part 177, a rotating disc 181 is arranged to fit the shaft 175. This rotating disc 181 has a fit hole 183 formed for engagement with the shaft 175. On the inner peripheral face of the fit hole 183 and at respective positions apart from each other by an angle of 180 degrees in the circumferential direction of the disc, notches 185 are formed so as to project outward in the radial direction. Further, the rotating disc 181 is provided, on its peripheral face, with engagement projections 187 which project outward in the radial direction, at respective positions apart from each other by an angle of 180 degrees in the circumferential direction. The rotating disc 181 is positioned relatively to the shaft 175 so that the inner edge of the fit hole 183 besides the notches 185 engages with the engagement projections 179. A spring 189 is interposed between the rotating disc 181 and the flange part 177. Hereat, in the child car seat body 29 (not shown in FIGS. 8A to 10), the rotating disc 181 is retained so as to be rotatable about the shaft. Additionally, a disengagement cam 191 connected to the above-mentioned switch 81 is fitted to the other end of the shaft 175. This disengagement cam 191 is provided with a slanted face 193 for engagement with the engagement projection 187 of the rotating disc 181. Consequently, when the disengagement cam 191 moves toward the flange part 177 in the axial direction, the slanted face 193 engages with the engagement projection 187 of the rotating disc 181 for its rotation. Noted that this disengagement cam 191 is not illustrated in FIGS. 8B and 9B.

Figure 6:
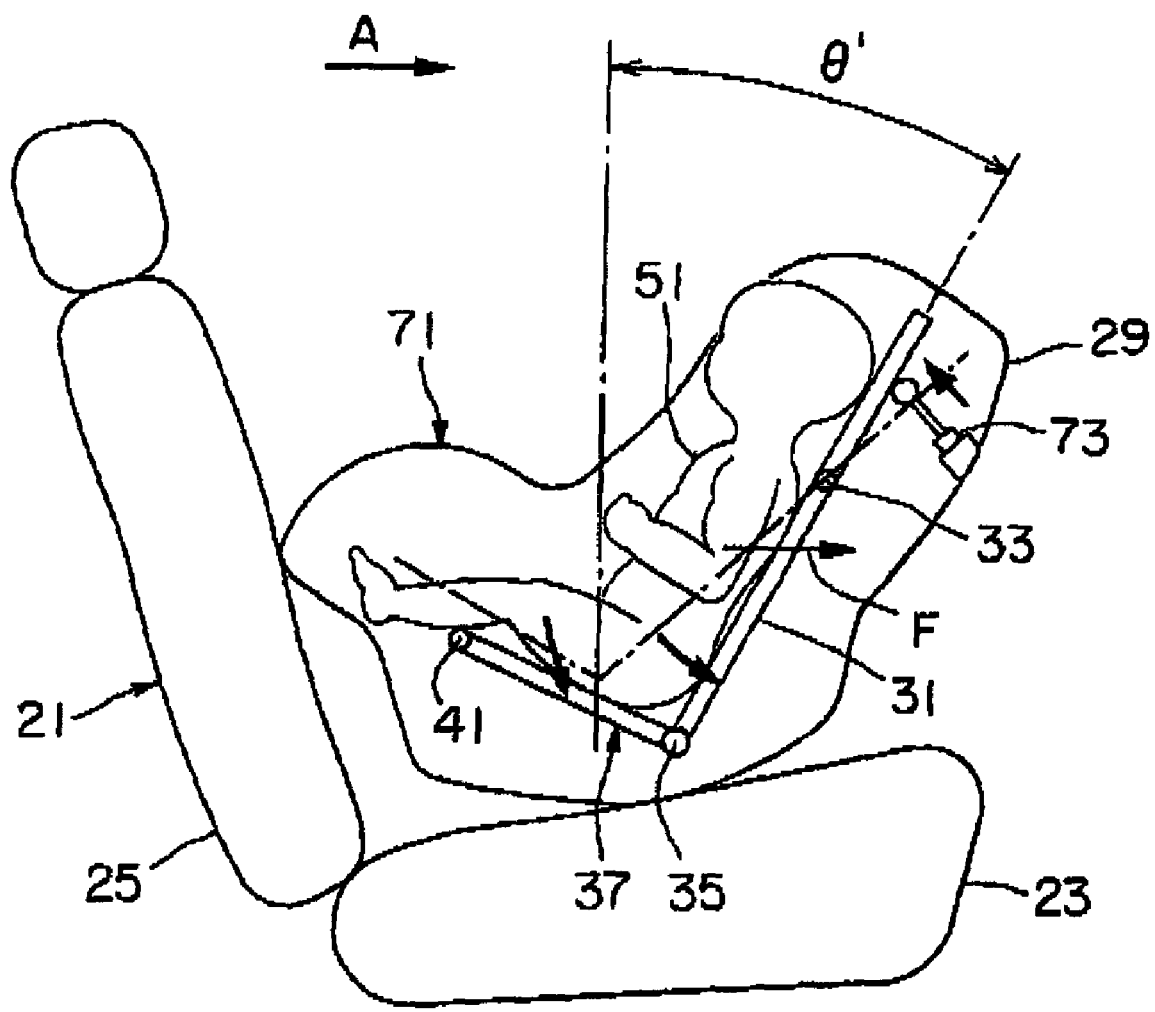
FIG. 6 is a schematic side view showing a condition of exerting an impact on the child car seat of FIG. 5.

In the force mechanism 73 mentioned above, when the above-mentioned switch 81 is pressed, then the disengagement cam 191 move to the left side, as shown in FIGS. 8A to 9A. Then, the slanted face 193 of the disengagement cam 191 engages with the engagement projection 187 of the rotating disc 181, allowing the disc 181 to rotate in the clockwise direction, as shown in FIGS. 8B to 9B. Then, the notches 185 of the rotating disc 181 rotate to move up to the positions of the engagement projections 179 of the shaft 175, so that the engagement between the engagement projections 179 and the fit hole 183 is released. Consequently, with the operation of the spring 189, the shaft 175 moves from a position of FIG. 9A to another position of FIG. 10 vigorously. Due to this movement, the back portion 31 fixed on the flange part 177 moves forward in relation to the child car seat body 29 retaining the rotating disc 181, rotating in the rising direction of the back portion 31 as shown in FIG. 6.

When the child car seat 71 having the force mechanism 73 and the switch mechanism 74 as above is subjected to a sudden braking, an inertia force F is exerted to the newborn 51. Due to this inertia force F, as similar to the situations of FIGS. 2 and 4, the back portion 31 rotates in the counter-clockwise direction and stands up. Therefore, the newborn 51 can support the inertia force F through the newborn's back, whereby it is possible to prevent a load from concentrating in a part of the body. Further, due to this inertia force F, a force in the traveling direction A is applied on the child car seat 27. In FIG. 7B, as a reaction of the above force, the seat belt 75 presses the belt guide 77 toward the child car seat body 20. Nevertheless, since the belt guide 77 cannot push the push-up switch 81 due to the strength of the springs 29, the force mechanism 73 does not operate.

Next, when a great inertia force F is applied on the newborn 51 due to a vehicle collision etc., as similar to the situation of sudden braking, the back portion 31 rotates in the counter-clockwise direction and stands up. Therefore, the newborn 51 can support the inertia force F through the newborn's back, whereby it is possible to prevent a load from concentrating in a part of the body. Further, due to an impact, the seat belt 75 presses the belt guide 77 strongly, while the belt guide 77 presses the push-up switch 81. Consequently, as shown in FIG. 6, the force mechanism 73 is activated to push an upper part of the back portion 71 upside the rotating shaft 33. Thus, since the rising movement of the back portion 31 is promoted, the newborn 51 can receive the impact through the newborn's back in all, whereby it is possible to prevent the impact from concentrating in a part of the body.

Note, although the activation of the force mechanism 73 is attained by the contact of the belt guide 77 with the push-up switch 81 in the above-mentioned embodiment, not limited to this embodiment only, the force mechanism may be activated by a sensor's detection of the beginnings of movements of the back portion 31 and the seat portion 37, the breakage of the joint part 63, the increase in a contact force between the seat belt 75 and the child car seat body 29, etc.

Next, the mechanical movements of the back portion 31 and the seat portion 37 at the sudden braking or the impact will be described in the child car seat of the present invention. In common with FIGS. 11 to 14, the back portion 31, the seat portion 37 and the newborn 51 in the normal state are respectively indicated by continuous lines, while the back portion 31, the seat portion 37 and the newborn 51 at the sudden braking or the impact are respectively indicated by two-dot chain lines.

Figure 11:
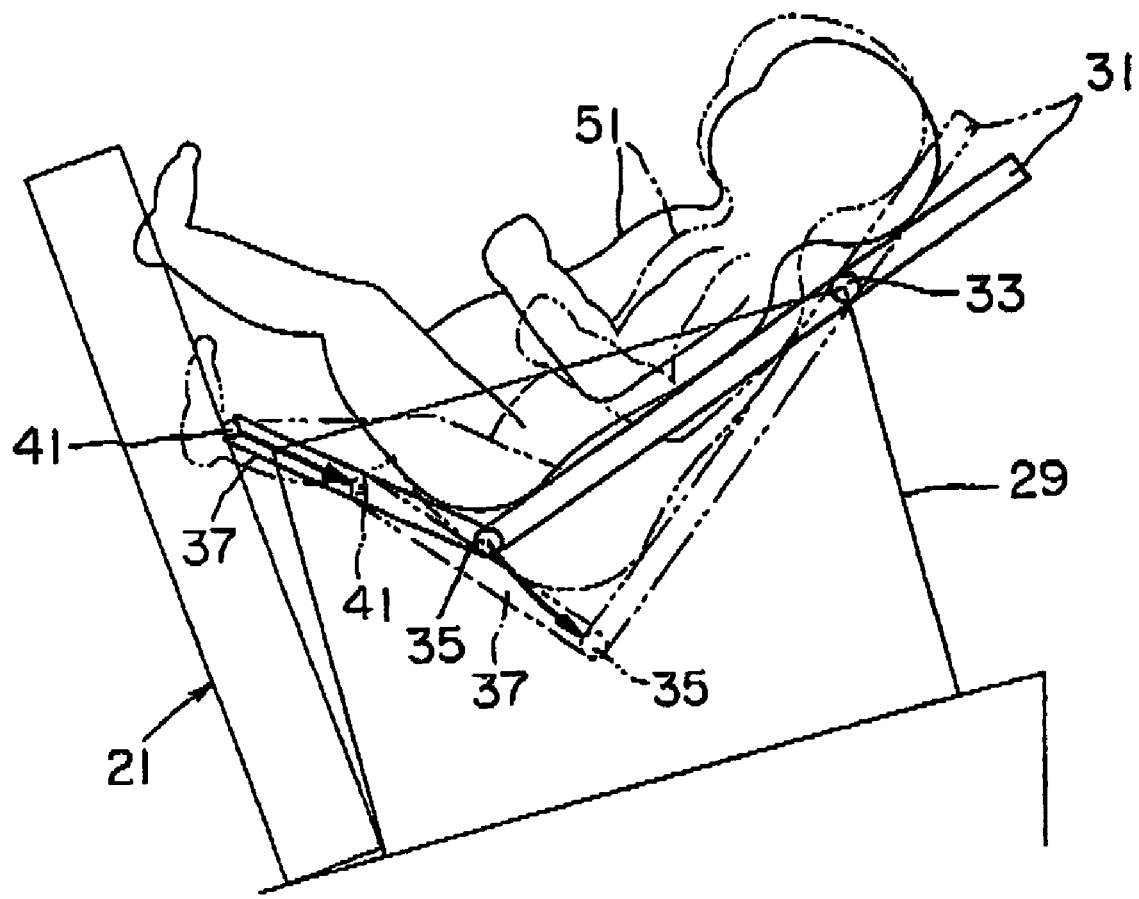
FIG. 11 is a mechanical side view showing a first example of mechanical motions of a back portion and a seat portion of the child car seat of the present invention.

FIG. 11 shows an arrangement where the rotating shaft 33 of the back portion 31 is fixed to the child car seat body 29, and the front end part 41 of the seat portion 37 is guided by a guide groove etc., in the extending direction of the seat portion 37 in the normal state. In this case, the connecting part 35 moves on an arc about the rotating shaft 33 as a center. According to this mechanism, with the simplest structure, it is possible to raise the back portion 31 certainly.

Figure 12:
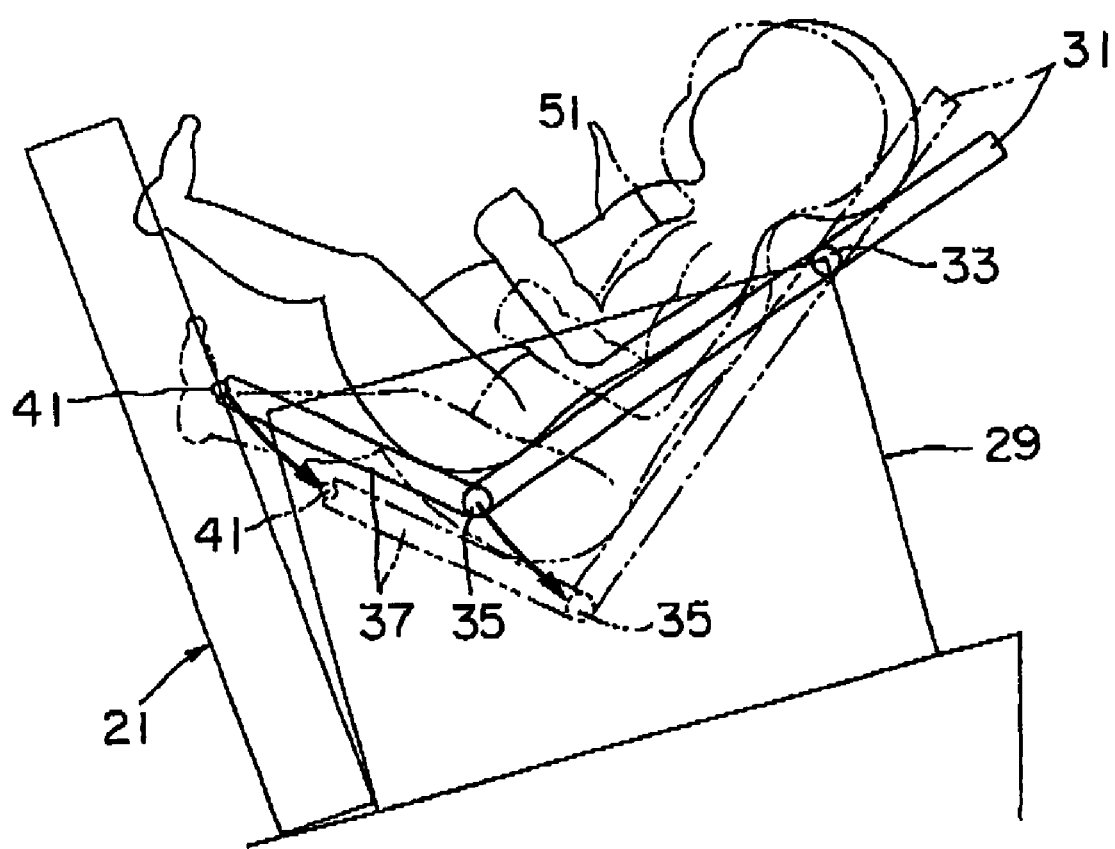
FIG. 12 is a mechanical side view showing a second example of mechanical motions of the back portion and the seat portion of the child car seat of the present invention.

FIG. 12 shows an arrangement where the rotating shaft 33 of the back portion 31 is fixed to the child car seat body 29, and the seat portion 37 swings so as to be always parallel with the seat portion in the normal state. In this case, the connecting part 35 and the front end part 41 follow respective arc tracks together. According to this mechanism, in comparison with the arrangement of FIG. 11, it is possible to make a bending angle between the newborn's body and its lower limbs at the time of rising somewhat larger and therefore, it is possible to lighten a burden on the newborn's body.

Figure 13:
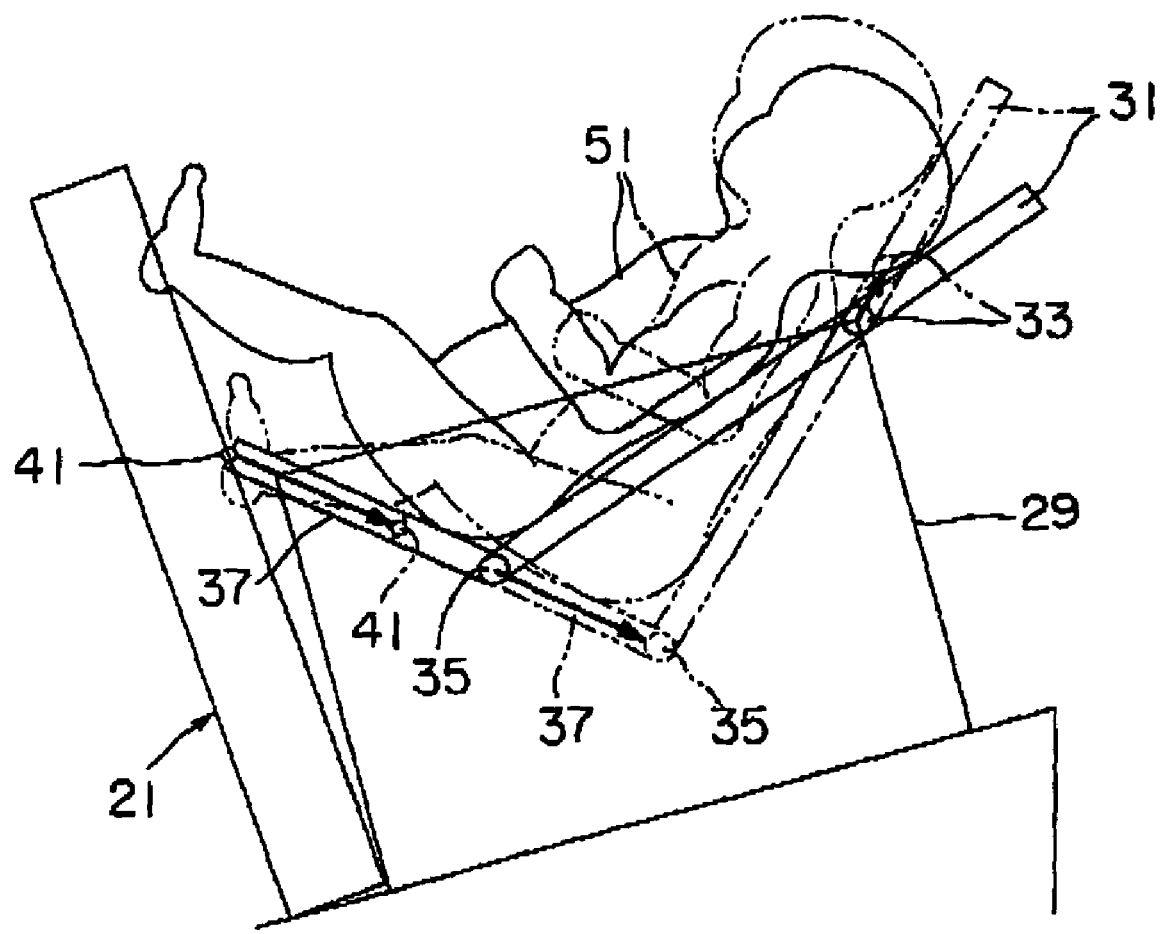
FIG. 13 is a mechanical side view showing a third example of mechanical motions of the back portion and the seat portion of the child car seat of the present invention.

FIG. 13 shows an arrangement where the rotating shaft 33 of the back portion is movable up and down, and the seat portion 37 is adapted so as to move back and forth in a plane containing the seat portion in the normal state. In this case, the track of the connecting part 35 is in alignment with the track of the front end pan 41. According to this mechanism, it is possible to let the rotating shaft 33 go upward at the time of rising, whereby an impact can be reduced that so much and it is possible to reduce the degree of a newborn's bending. That is, it is possible to lighten a burden on the newborn's body as much.

Figure 14:
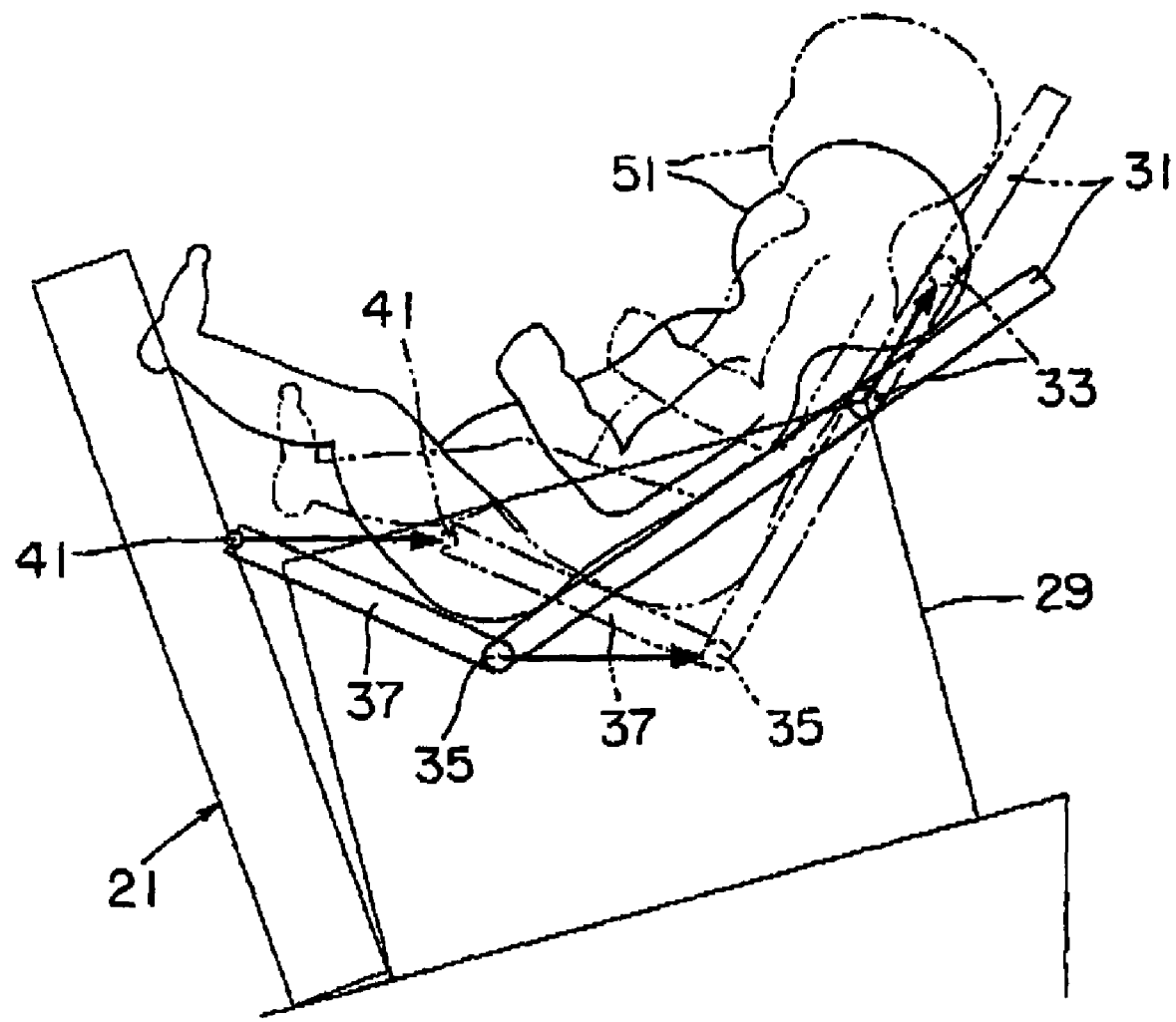
FIG. 14 is a mechanical side view showing a fourth example of mechanical motions of the back portion and the seat portion of the child car seat of the present invention.

FIG. 14 shows an arrangement where the rotating shaft 33 of the back portion is movable up and down, and the seat portion 37 is adapted so as to translate (move in parallel). Then, the track of the connecting part 35 is in parallel with the track of the front end part 41. According to this mechanism, in comparison with the arrangement of FIG. 13, it is possible to let the rotating shaft 33 go upward further, whereby an impact can be reduced that so much and it is possible to reduce the bending degree of the newborn's body.

FIG. 15A to FIG. 18B are views showing concrete examples of the shock absorbing mechanism 49.

Figure 15A:
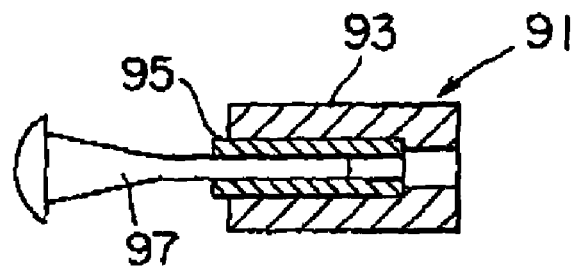
FIG. 15A is a sectional view showing a first example of a shock absorbing mechanism and FIG. 15B is a sectional view showing a condition of exerting an impact on the shock absorbing mechanism of FIG. 15A.
Figure 15B:
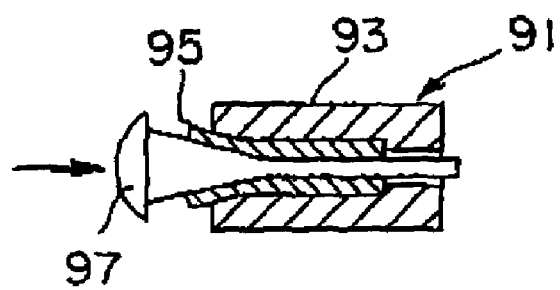

FIG. 15A shows a shock absorbing mechanism 91. This shock absorbing mechanism 91 includes a frame 93 fixed to, for example, the child car seat body 29, a cylindrical buffer member 95 and a conical pin 97 fixed on e.g. the side of the connecting part 35. As shown in FIG. 15B, when the conical pin 97 is press-fitted to the buffer member 95 on receipt of an impact, the mechanism absorbs an impact energy in process of this press fitting operation, so that the impact is reduced and attenuated.

Figure 16A:
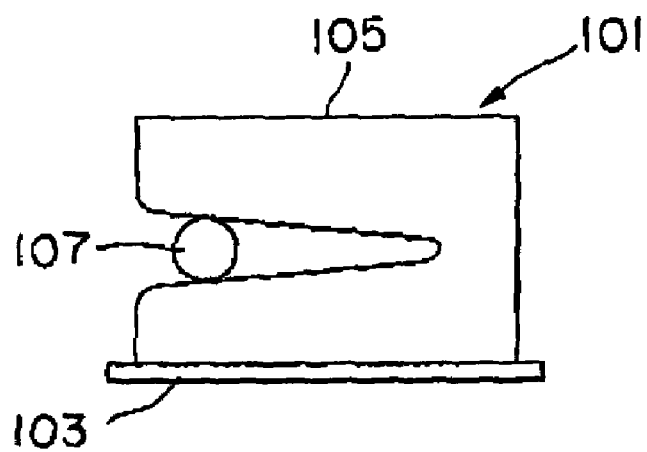
FIG. 16A is a sectional view showing a second example of the shock absorbing mechanism and FIG. 16B is a sectional view showing a condition of exerting an impact on the shock absorbing mechanism of FIG. 16A.
Figure 16B:
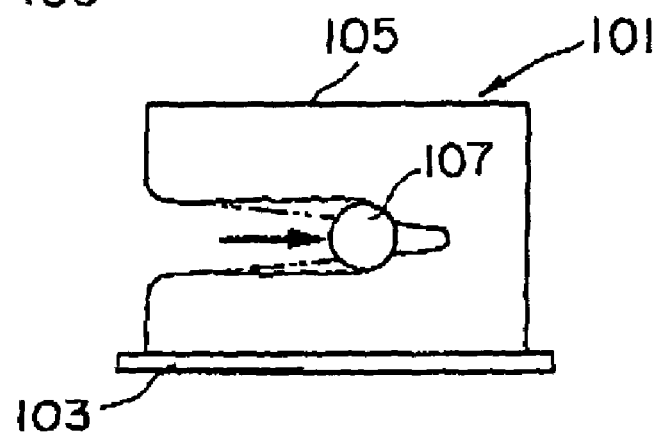

FIG. 16A shows a shock absorbing mechanism 101. This shock absorbing mechanism 101 includes a frame 103 fixed to, for example, the child car seat body 29, a plate-shaped buffer member 105 mounted on the frame 103 to have a notch and a pin 107 fixed on e.g. the side of the connecting pan 35, As shown in FIG. 16B, when the pin 107 is press-fitted into the notch of the buffer member 105 on receipt of an impact, the mechanism absorbs an impact energy in process of this press fitting operation, so that the impact is reduced and attenuated.

Figure 17A:
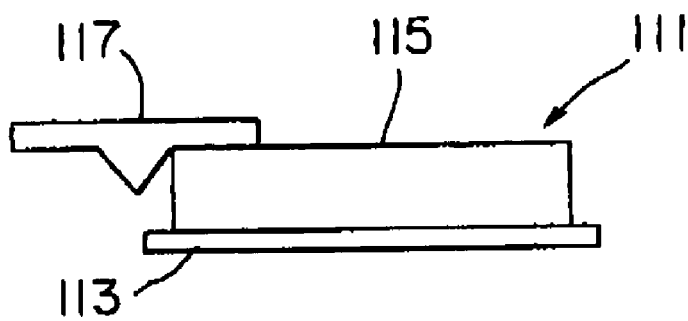
FIG. 17A is a sectional view showing a third example of a shock absorbing mechanism and FIG. 17B is a sectional view showing a condition of exerting an impact on the shock absorbing mechanism of FIG. 17A.
Figure 17B:
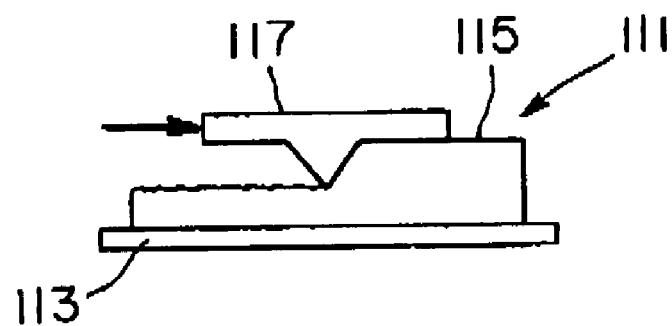

FIG. 17A shows a shock absorbing mechanism 111. This shock absorbing mechanism 111 includes a frame 113 fixed to, for example, the child car seat body 29, a buffer member 115 in the form of a thick plate mounted on the frame 113 and a projection plate 117 fixed on e.g. the side of the connecting part 35. As shown in FIG. 17B, when the projection plate 117 under pressure is press-fitted on an upper face of the buffer member 115 on receipt of an impact, the mechanism absorbs an impact energy in process of this press fitting operation, so that the impact is reduced and attenuated.

Figure 18A:
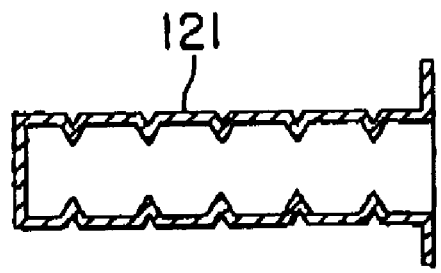
FIG. 18A is a sectional view showing a fourth example of the shock absorbing mechanism and FIG. 18B is a sectional view showing a condition of exerting an impact on the shock absorbing mechanism of FIG. 18A.
Figure 18B:
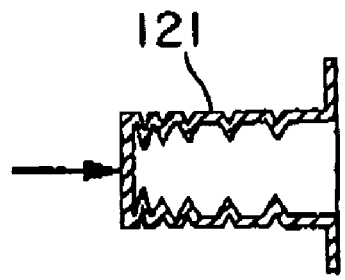

FIG. 18A shows a shock absorbing mechanism 121. This shock absorbing mechanism 121 consists of a bellows-shaped buffer member. As shown in FIG. 18B, when the mechanism is subjected to an impact, a bellows-shaped part of the buffer member is compressed in the axial direction and thus deformed. In process of the deformation, the mechanism absorbs an impact energy, so that the impact is reduced and attenuated.

Noted that soft steel material resin or the like is suitable for the buffer member of the above shock absorbing mechanism.

In this way, this child car seat includes the child car seat body 29, the back portion 31 rotatably held in inclination by the child car seat body 29, the seat portion 37 rotatably connected to the lower part of the back portion 31 and the shock absorbing mechanism 49 arranged between the child car seat body 29 and either one or both of the back portion 31 and the seat portion 37. The rotation pivot of the back portion 31 is positioned upward of the gravity center of the newborn. The seat portion 37 and the back portion 31 hold the newborn. When an impact force directing from the front face side of the back portion 31 toward its back face side is applied on the newborn, the back portion 31 rotates in its rising direction and the shock absorbing mechanism 49 operates to reduce the impact force applied on the newborn. Therefore, with the above-mentioned constitution, the newborn can be held on the child car seat in a state close to a condition where the newborn lies on its back. At the time of a sudden braking or impact, since the back portion 31 stands up, the newborn is capable of receiving the impact through the whole area of a newborn's back and it is possible to prevent the impact from concentrating in a part of the newborn's body. Additionally, without requiring any special device, it is possible to raise the back portion 31 by making use of an inertia force. Accordingly, the certain action of the child car seat can be realized with a simple mechanism and it is possible to reduce the manufacturing cost of the child car seat.

As mentioned above, according to the present invention, the child car seat comprises the child car seat body, the back portion rotatably held in inclination by the child car seat body, the seat portion rotatably connected to the lower part of the back portion and the shock absorbing member arranged between the child car seat body and either one or both of the back portion and the seat portion, wherein the seat portion and the back portion are adapted so as to hold a newborn thereon. Further, since the child car seat is constructed in a manner that, when an impact force directing from the front face side of the back portion toward the back face side of the back portion is applied on the newborn, the back portion rotates in its rising direction and the shock absorbing member operates to reduce the impact force applied on the newborn, it is possible to prevent the impact from concentrate in a part of the newborn at the time of impact, despite of holding the newborn in a condition where it nearly lies on its back at a normal state.

The invention claimed is:

1. A child car seat comprising:
a child car seat body;
a back portion rotatably held in inclination by the child car seat body;
a seat portion rotatably connected to a lower part of the back portion; and
a shock absorbing member arranged between the child car seat body and either one or both of the back portion and the seat portion;
wherein the seat portion and the back portion are adapted so as to hold a newborn thereon, and the child car seat is constructed in a manner that, when an impact force directing from a front face side of the back portion toward a back face side of the back portion is applied on the newborn, the back portion rotates in its rising direction and the shock absorbing member operates to reduce the impact force applied on the newborn,
wherein the back portion is provided with a rotating means which forcibly rotates the back portion in a counter clockwise direction to raise the back portion when the impact force is applied thereon,
wherein the direction of the impact force is opposite to the counter clockwise direction that the back portion of the car seat is rotated by the rotating means,
wherein the shock absorbing member is adapted so as to absorb an impact by a plastic deformation of the shock absorbing member, and
wherein the shock absorbing member is adapted so as to absorb the impact since one member digs into another member.

2. The child car seat as claimed in claim 1, wherein a rotation pivot of the back portion is positioned above as gravity center of the newborn.

3. The child car seat as claimed in claim 1, wherein the back portion is rotatably supported by the child car seat body.

4. The child car seat as claimed in claim 3, wherein a front end part of the seat is movable along an extending direction of the seat portion at its normal state.

5. The child car seat as claimed in claim 3, wherein the seat portion is adapted so as to swing in parallel with respect to itself.

6. The child car seat as claimed in claim 1, wherein
the back portion is rotatably supported by a bearing number, and the bearing number is movably held by the child car seat body.

7. The child car seat as claimed in claim 6, wherein
the bearing member is movable up and down, and the seat portion moves in a plane containing the seat portion at its normal state.

8. The child car seat as claimed in claim 6, wherein
the bearing member is movable up and down, and the seat portion moves in parallel with the seat portion at its normal state.

9. A child car seat comprising:
a child car seat body;
a back portion rotatably held in inclination by the child car seat body;
a seat portion rotatably connected to a lower part of the back portion; and
a shock absorbing member arranged between the child car seat body and either one or both of the back portion and the seat portion;
wherein the seat portion and the back portion are adapted so as to hold a newborn thereon, and the child car seat is constructed in a manner that, when an impact force directing from a front face side of the back portion toward a back face side of the back portion is applied on the newborn, the back portion rotates in its rising direction and the shock absorbing member operates to reduce the impact force applied on the newborn,
wherein the back portion is provided with a rotating means which forcibly rotates the back portion in a counter clockwise direction to raise the back portion when the impact force is applied thereon,
wherein the direction of the impact force is opposite to the counter clockwise direction that the back portion of the car seat is rotated by the rotating means, and
wherein the rotating means comprises a switch mechanism which operates when the impact force is applied, and a force mechanism which is driven by the switch mechanism.

10. The child car seat as claimed in claim 9, wherein
the switch mechanism is arranged in a back portion of the child car seat body and which is adapted so as to operate when a seat belt for holding the child car seat body presses the switch mechanism with a force more than a predetermined force, due to an impact.

11. The child car seat as claimed in claim 9, wherein
the force mechanism includes a shaft, a spring engaged with the shaft to project the shaft against the back portion of the child car seat body and an engagement mechanism which engages the shaft while compressing the spring, and the force mechanism is adapted so to be driven since the engagement mechanism is disengaged by the switch mechanism, whereby the shaft is projected to press the back portion.

12. A child car seat comprising:
a child car seat body;
a back portion rotatably held in inclination by the child car seat body;
a seat portion rotatably connected to a lower part of the back portion; and
a forcing mechanism configured to forcibly rotate the back portion in a direction opposite to a direction of an impact force applied to the child car seat such that the back portion rises to situate a child in the car seat in a substantially perpendicular position,
wherein the forcing mechanism comprises:
a switch configured to operate when the impact force is applied; and
a forcing member driven by the switch and configured to forcibly rotate the back portion in the direction opposite to the direction of the applied impact force.

13. The child car seat as claimed in claim 12, wherein the switch is arranged in a back portion of the child car seat body and is configured to operate when a seat belt for holding the child car seat body presses the switch with a force more than a predetermined force, due to the applied impact force.

14. The child car seat as claimed in claim 13, wherein the forcing member includes a shaft, a spring engaged with the shaft to project the shaft against the back portion of the child car seat body and an engagement mechanism which engages the shaft while compressing the spring, and the forcing member is configured to be driven because the engagement mechanism is disengaged by the switch, whereby the shaft is projected to press the back portion.

15. The child car seat as claimed in claim 12, further comprising:
a shock absorbing member arranged between the child car seat body and either one or both of the back portion and the seat portion.

16. The child car seat as claimed in claim 15, wherein the shock absorbing member comprises a plastic shock absorbing member.

17. A child car seat comprising:
a child car seat body;
a back portion rotatably held in inclination by the child car seat body;
a seat portion rotatably connected to a lower part of the back portion;
a forcing mechanism configured to forcibly rotate the back portion in a direction opposite to a direction of an impact force applied to the child car seat such that the back portion rises to situate a child in the car seat in a substantially perpendicular position; and
a shock absorbing member arranged between the child car seat body and either one or both of the back portion and the seat portion,
wherein the shock absorbing member comprises first and second members in which the first member digs into second member to provide shock absorbance.

18. The child car seat as claimed in claim 12, further comprising:
a rotation pivot of the back portion positioned above a gravity center of the child.

19. The child car seat as claimed in claim 12, wherein the back portion is rotatably supported by the child car seat body.

20. The child car seat as claimed in claim 12, wherein a front end part of the seat is movable along an extending direction of the seat portion at its normal state.

21. The child car seat as claimed in claim 12, wherein the seat portion is moveable such that the applied impact force moves the seat portion connected to the lower part of the back portion to the rear side of the back portion.

22. A child car seat comprising:
a child car seat body;
a back portion rotatably held in inclination by the child car seat body;
a seat portion rotatably connected to a lower part of the back portion;
a position maintaining device arranged between the child car seat body and either one or both of the back portion and the seat portion to maintain a position of either one or both of the back portion and the seat portion in relation to the child car seat body, at a normal state of the child car seat; and
a shock absorbing member arranged between the child car seat body and either one or both of the back portion and the seat portion,
wherein the position maintaining device includes a joint part which is broken when an impact force is applied to the child car seat such that a tension is applied to the joint part causing it to break so the back portion rises to situate a child in the car seat in a substantially perpendicular position, and
wherein the shock absorbing member comprises first and second members in which the first member digs into second member to provide shock absorbance.

23. The child car seat as claimed in claim 22, wherein the shock absorbing member comprises a plastic shock absorbing member.

24. The child car seat as claimed in claim 22, further comprising:
a rotation pivot of the back portion positioned above a gravity center of the child.

25. The child car seat as claimed in claim 22, wherein the back portion is rotatably supported by the child car seat body.

26. The child car seat as claimed in claim 22, wherein a front end part of the seat is movable along an extending direction of the seat portion at its normal state.

27. The child car seat as claimed in claim 22, wherein the seat portion is moveable such that the applied impact force moves the seat portion connected to the lower part of the back portion to the rear side of the back portion.

* * * * *